Nov. 1, 1966  W. C. TRETHEWEY  3,283,055
TEMPERATURE CONTROL SYSTEM FOR HIGH TEMPERATURE
MELTERS OR THE LIKE
Filed Aug. 15, 1963  2 Sheets-Sheet 1
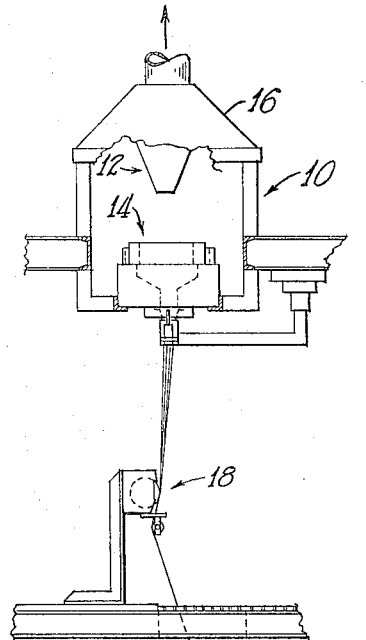
Fig. 1
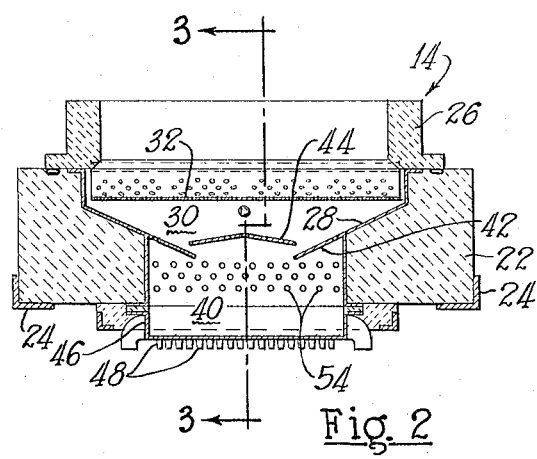
Fig. 2
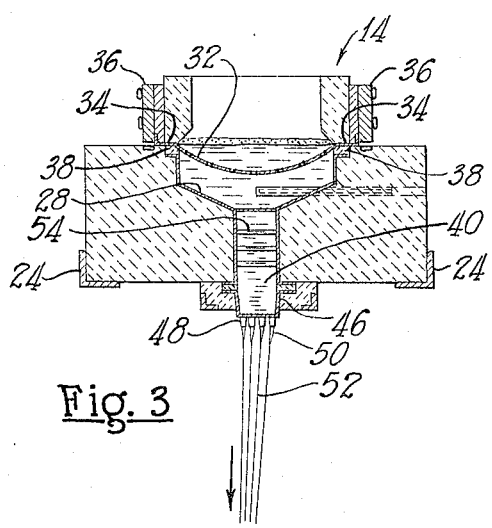
Fig. 3
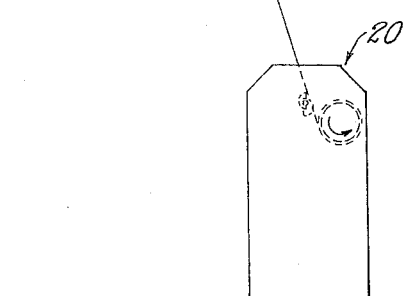
INVENTOR
WILLIAM C. TRETHEWEY
BY
Staelin & Overman
ATTORNEYS INVENTOR.
WILLIAM C. TRETHEWEY
BY
Staelin & Overman
ATTORNEYS

United States Patent Office 3,283,055
Patented Nov. 1, 1966

3,283,055
TEMPERATURE CONTROL SYSTEM FOR HIGH
TEMPERATURE MELTERS OR THE LIKE
William C. Trethewey, Newark, Ohio, assignor to Owens-Corning Fiberglas Corporation, a corporation of Delaware
Filed Aug. 15, 1963, Ser. No. 302,264
12 Claims. (Cl. 13—6)

This invention relates to a system for controlling temperature in a high temperature melter or the like, particularly of the type used to make high strength, highly refractory fibers.

After a long search for high temperature, high strength glass fibers, recently certain batch compositions of mineral materials have been discovered which have high temperature fusing characteristics and can be formed into filaments having exceptionally high strengths. However, such compositions are fusible only at very high temperatures, rendering the production of fibers therefrom extremely difficult and almost impossible from a practical, commercial standpoint.

One of the principal areas in which problems have arisen in attempting to form fibers from the highly refractory mineral compositions is in the control of temperature of the bushing or melter used to reduce the batch compositions to a fusible and fiberizable state. Temperatures in the order of 3000° F. are required to fuse the compositions, and at these temperatures a reliable temperature control system, other than an expensive, laboratory-type arrangement, is difficult to obtain. The use of thermocouples at these temperatures has proven to be impractical because of the lack of reliable, commercially-available thermocouples which can accurately indicate such high temperatures for any period of time. Optical temperature control devices also have been unsuitable because they lack a sufficient degree of sensitivity, thereby being incapable of maintaining the temperature of the bushing within a desired range. Still other systems are too slow acting so as to be incapable of adequately controlling sudden temperature changes.

The present invention provides an improved temperature control system particularly designed for use in controlling high temperature melters and bushings. In accordance with the new temperature control system, an electrically-conducting member or plate is incorporated in the melter or bushing, which plate preferably is heated to or close to the melting temperature of the glass and constitutes the main or sole heat source for the glass. The electrical resistance of the plate is affected by the plate temperature, with the resistance of the plate ordinarily increasing as the temperature increases and decreasing as the temperature decreases. The resistance of the plate is then sensed, which can be accomplished, for example, by sensing an electrical characteristic or property, such as voltage or current, which varies with the amount of resistance of the plate. The sensing means can then be used to produce a signal responsive to the resistance of the plate, with this signal controlling the power input to the plate. While either the voltage or current across the plate can be sensed, for example, both of which vary with the resistance, in a preferred form, the voltage is sensed and is held constant by varying the current applied to the plate. The current is varied to change the heating effect on the plate and thereby raise or lower its temperature and its resistance, to raise or lower the voltage to a predetermined value. The value of the voltage, by prior calibrations, can be used to determine the temperature of the plate and, hence, the temperature of the composition being melted. In the preferred form, the electrical signal or voltage produced in response to the resistance of the plate is amplified and combined with a control signal with the combined signal then used to operate silicon controlled rectifiers which control current to the plate in the bushing.

A silicon controlled rectifier component is preferred in the temperature control circuit because it has several important advantages. One of the biggest advantages is the reduction in size and weight of the controls which is made possible by eliminating the saturated core reactors commonly used in temperature control circuits. Where many bushings are operated in one location, the reduced size and weight can be very important in enabling a larger number of bushings to be used in a given area and even in reducing the structural reinforcement of the building heretofore necessary when a large number of saturated core reactors were employed.

The silicon controlled rectifier component also reduces the time constant of the circuit and enables closer control of temperature to be obtained. The entire melting system is thus provided with a more uniform and stable temperature characteristic so that fibers of more uniform dimension and strength can be produced from the melting unit and greater continuity of production can be achieved. Ordinarily with such bushings, when fibers cease to be attenuated because packages are being changed, for example, a temperature peak is experienced in the bushing. However, with the faster acting silicon controlled rectifier circuitry, this peak is substantially reduced or eliminated.

It is, therefore, a principal object of the invention to provide an improved temperature control system designed particularly for use with melters for highly refractory mineral compositions and other heat softenable materials.

Another object of the invention is to provide a temperature control system for melters for highly refractory mineral compositions, which system is more reliable and sensitive than those heretofore employed.

Still another object of the invention is to provide an improved temperature control system for use with a high temperature melter, which system is more compact and of lighter weight than those heretofore known.

Other objects and advantages of the invention will be apparent from the following detailed description of a preferred embodiment thereof, reference being made to the accompanying drawings, in which:

FIG. 1 is a schematic view in elevation of high temperature fiber-producing apparatus embodying the invention;

FIG. 2 is a side view in vertical cross section of a high temperature melter used in the apparatus of FIG. 1;

FIG. 2 is a front view in vertical cross section taken along the line 3—3 of FIG. 2.

Figure 4:
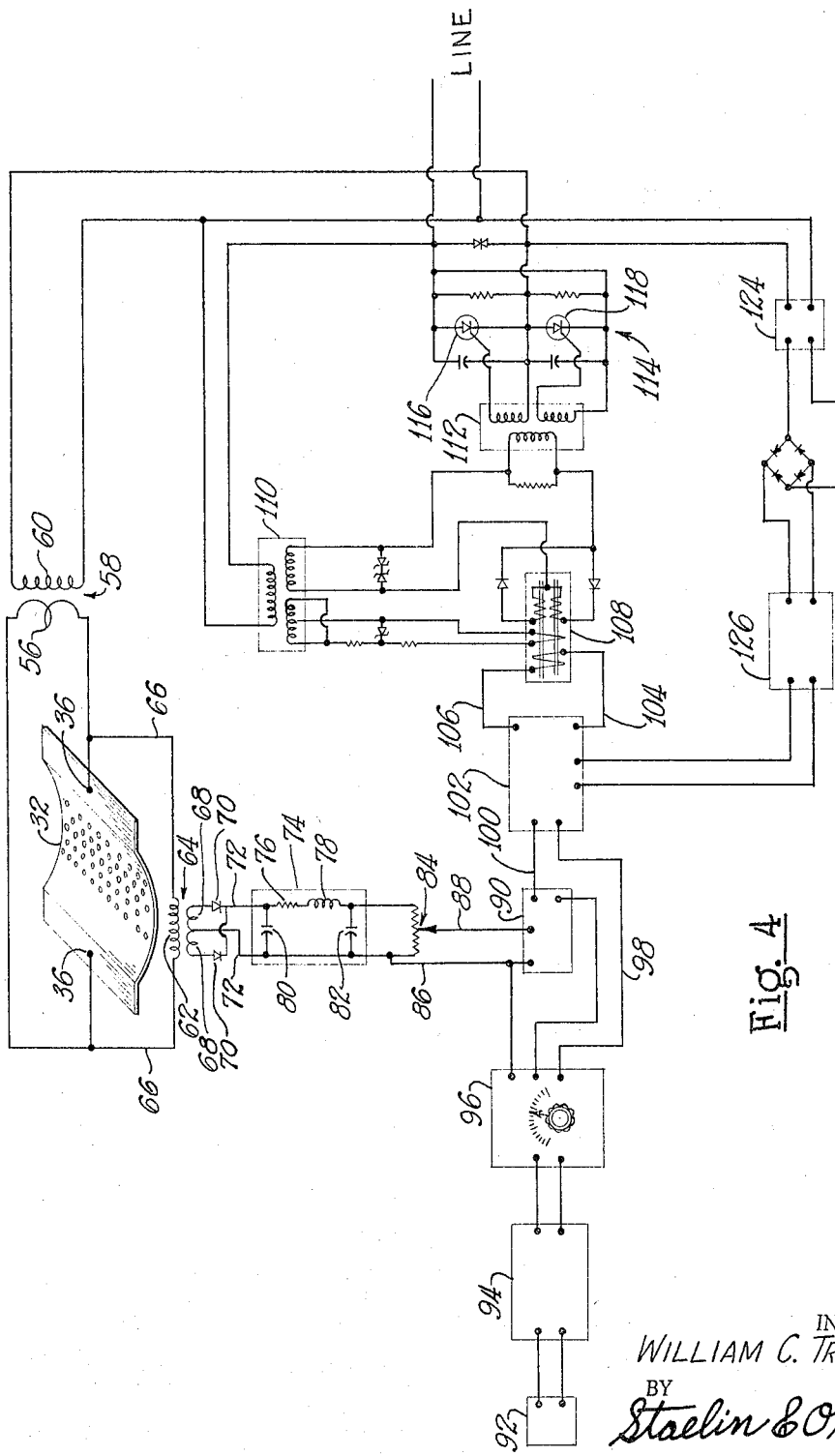
FIG. 4 is a diagrammatic view of the temperature control system used with the melter of FIGS. 2 and 3.

FIG. 1 shows overall refractory fiber-producing apparatus, indicated at 10, which is particularly adapted for processing highly refractory glass batches, such as those having a high silica content, and for attenuating glass filaments from the resulting molten batch. The batch is fed continuously and distributed over the top of a melter at a rate and in a manner such as to promote the maintenance of a uniform layer of the batch on molten glass in the melter therebelow. The batch on the melt is gradually melted or fused as it moves downwardly, and subsequently the temperature of the melt is decreased to condition the melt for delivery in the form of streams which are attenuated into filaments.

The melt is maintained in the receptacle for a period of time and at a temperature sufficient to promote the fining and refining of the melt as it moves downwardly through the receptacle or bushing so as to attain a homogeneous melt having a high degree of decrystallization of the highly refractory glass. The process is of a character enabling the formation of high strength filaments, in the order of 700,000 pounds per square inch or more, at high lineal rates of speeds, which makes feasible the commercial production of such filaments.

The apparatus 10 basically includes a batch supply and distributing apparatus indicated at 12 for feeding batch uniformly to the open top of a heated receptacle or melter 14 embodying the invention. The batch feeder 12 and the melter 14 are partially enclosed in a suitable ventilating hood 16. An applicator 18 is located below the melter 14 for applying a size or coating to newly formed filaments attenuated from the melter. Finally, below the applicator 18 is a winder 20 which pulls the filaments and winds them as a strand onto a suitable forming tube to form a package of strand of the high temperature, high strength filaments.

The melter 14 is shown in more detail in FIGS. 2 and 3 and is of a particular construction in order to effectively process and condition the highly refractory glass batch from which the fine, high strength filaments are made. The melter 14 includes a refractory wall structure 22 carried by suitable supports 24 and an upper refractory wall 26 which forms an entrance for the melter 14 to receive the batch material from the feeder and distributor 12. A highly refractory metal liner 28 lines the interior of the refractory wall 22 to establish a melting chamber 30. The liner 28 can be made of a platinum alloy or other suitable refractory material which will not deteriorate appreciably under the high melting temperatures existing in the chamber 30. An electrically conducting heater plate or member 32 is positioned across the chamber 30 so that all batch supplied to the entrance must pass through the plate 32. The heater plate 32, which can be of an alloy of platinum and rhodium, is perforated and is supplied with electrical power to raise the temperature of the plate and to melt fully all of the refractory batch material passing through the perforations. Electrical connections for the heater plate 32 are provided by edge strips 34 (FIG. 3) connected to terminal blocks 36 with the heater plate 32 and the edge strips 34 electrically insulated from the liner 28 by suitable insulating bars 38. Suitable cooling tubes are positioned around the terminal blocks 36, as is well known in the art.

Below the melting chamber 30 is a glass flow channel 40 which is partially separated from the melting chamber 30 by baffle members 42 and 44 which divert the glass from a vertical path to enable more thorough mixing thereof and thereby to achieve a more homogenous melt. The channel 40 communicates with a bushing tip section 46 having a plurality of tips 48 through which the thoroughly melted glass is discharged in the form of streams 50 which are then attenuated into filaments 52 by means of the winder 20 of FIG. 1. A suitable fin cooler can be employed adjacent the tips 48, if desired, as is well known in the art.

In order to cool the molten glass somewhat and place it in a more viscous condition for attenuation of filaments therefrom, a plurality of cooling rods 54 are disposed tansversely in the chamber 40 to help conduct some heat away from the glass flowing through the channel 40. Heat can also be supplied to the bushing tip section 46 but, since the temperature there is lower, it usually can be controlled by means of a conventional thermocouple.

In the operation of the melter 14, the batch supplied thereto is regulated so that the top of the melter within the wall means 26 is always covered with raw batch, with the batch reaching the fusing temperature and melting before it comes into contact with the heater plate 32. With this arrangement, all of the glass is heated to a high temperatuer by the heater plate 32 and all of the resultant glass must pass through the perforations in the heater plate as it moves through the chamber 30 toward the channel 40.

For high strength glasses, with which the present invention is particularly concerned, the heater plate must be capable of reaching temperatures of 3000° F. or higher and must be held closely to the desired temperature. Inaccurate temperature control may result in an excessively hot plate in which case all of the batch above the plate may be melted so that the raw batch no longer forms a protective cover and the molten batch will become contaminated. On the other hand, if the plate 32 is at too low a temperature, the batch will tend to overflow the entrance wall 26 and at the same time voids may result in the chamber 30 below the strip 32, with air in the voids subsequently attacking the liner 28 or the plate 32. Of course, inaccurate maintenance of temperature of the heater plate 32 also will affect the attenuation of the filaments from the bushing tip section 46 and excessive variations in temperature will affect the quality of the resulting filaments and variation in the diameter thereof.

After passing through the plate 32, the melt moves downwardly in the chamber 30 and passes the baffles 42 and 44 which help to refine and homogenize the melt, after which it is mixed further by the rods 54 which cool the melt to a temperature more suitable for fiber formation.

Referring more particularly to FIG. 4, a signal which varies according to the resistance of the heater plate or member 32 is used to control the temperature of the plate by regulating the power supply to it. The resistance of the plate 32, in turn, varies with the temperatures of the heater plate. The terminals 36 of the plate 32 are connected to a secondary winding 56 of a power transformer, a primary winding 60 of the transformer 58 being supplied with 440 volt alternating line current, for example. The electrical characteristic of the plate 32 which is sensed, can be the voltage drop across the heater plate 32 which is in order of from two to 5½ volts, for example. This voltage is dependent upon the resistance of the heater plate 32 which, in turn, is dependent upon the temperature of the plate 32. The voltage signal is impressed on a primary winding 62 of a signal transformer 64 through lines 66 connected across the heater plate 32. The signal transformer 64 provides approximately a 4:1 reduction in voltage so that the voltage across a secondary winding 68 will be from approximately ½ to 1½ volts. The secondary voltage is rectified by diodes 70 and supplied to a pi-filter circuit through supply lines 72, the filter being represented by a box 74. The filter 74 includes a resistor 76 and an inductor 78 in series in one of the lines 72 and capacitors 80 and 82 across the lines 72. The main purpose of the filter 74 is to average out sudden changes in the first signal produced by the transformer 64 in response to the resistance of the heating member 32, and, in effect, to slow down the response of the temperature control system. A sudden increase in the voltage causes the capacitors 80 and 82 to charge while a sudden drop will enable them to discharge, thereby tending to average out the sudden change. The resistance 76 and the inductance 78 tend to slow down the charging and discharging of the capacitors.

The resulting modified, second signal from the filter 74 is applied across a voltage divider 84 with a final output signal, which is proportional to the voltage across the heater plate 32 being supplied through lines 86 and 88. This is a direct current signal of a magnitude in the order of ten millivolts.

The final second signal is fed through the lines 86 and 88 to an input filter indicated at 90 which filters out any stray 60-cycle current associated with the input signal. The input signal is then combined with a control signal of opposite polarity which is established by suitable means including voltage source 92, a voltage control and temperature compensating unit 94, and a control signal regulator 96. A precise, uniform signal compensated for temperature changes is established by the unit 94 and the magnitude of this signal is regulated by the regulator 96 which, in turn, controls the temperature of the heating member 32 and, hence, the temperature of the composition being melted. A combined voltage is impressed across lines 98 and 100 if the actual temperature of the melter is other than that desired, in which instance, the signal across the lines 86 and 88 will differ from the control signal and the difference will appear as a combined signal across the lines 98 and 100. If the temperature of the heating member 32 is equal to that desired, as is set by the regulator 96, no combined signal will appear across the lines 98 and 100.

The lines 98 and 100 are connected to a two-stage magnetic amplifier or transformer 102 which produces a signal of alternating current from 2–5 milliamperes at its output across lines 104 and 106. This signal is fed to a single stage magnetic amplifier or transformer 108, the bias of which receives power from a power transformer 110 which also supplies current across the primary of a firing transformer 112 for the silicon-controlled rectifiers. Back-to-back Zener diodes are located in the power transformer circuit to provide square or clipped pulses to the transformer 112.

The secondary windings of the transformer 112 are connected to a silicon-controlled rectifier assembly 114 which includes two silicon-controlled rectifiers designated 116 and 118. These, for example, are available from General Electric Company under the commercial designation Type C60. The two silicon-controled rectifiers are arranged to control both halves of the cycles of the alternating current power source and to handle the high voltage levels incurred. Suitable resistors and capacitors are associated with the silicon-controlled rectifiers shown. The resistors have a resistance less than the forward leakage resistance of the respective rectifiers so that the potential distribution across the overall assembly 114 is controlled by the resistors rather than by the leakage across the rectifiers. The capacitors are used to suppress transients produced upon the firing of the silicon-controlled rectifiers. The silicon-controlled rectifiers are fired when the power from the secondaries of the transformer 112 exceeds a predetermined magnitude and the rectifiers then become conducting to close the circuit from the main power source to the heater member 32.

A feed-back transformer assembly indicated at 124 is used to feed back fully rectified power to a feed-back circuit indicated at 126 with the output being fed to the bias of the first stage of the two-stage magnetic transformer 102. This feed-back circuit serves the purpose of establishing a more stable voltage for the system.

The components of the system represented by boxes are commercially available and are shown in detail in an instruction book entitled "Special Instructions G–1882" published by The Foxboro Company, of Foxboro, Mass.

In the overall operation of the temperature control system, the heating member 32 can be brought up to a predetermined temperature by manual controls (not shown), after which the automatic system is placed in operation. For example, if the melter is to be operated at 3000° F., it may be heated to 2400° F. by manual manipulation. When placed under automatic control, the regulator 96 is set to a desired temperature thereby to produce an appropriate control signal. The voltage across the heater member 32 is sensed and a first signal is fed through the filter circuit 74 to average out any sudden changes in voltage. The final signal is then fed through the lines 86 and 88 and combined with the control signal to produce a combined signal across the lines 98 and 100, if the temperature of the heater member is different from that desired. This signal is fed through the two-stage transformer 102 and the single-stage transformer 108 and, under the influence of transformer 110, current is supplied to the primary of the rectifier transformer 112. When the temperature of the heater strip 32 is below that desired and the signal from the transformer 112 is of a given magnitude, the silicon-controlled rectifiers 116 and 118 are fired which then become conducting and supply power through the primary winding 60 of the melter transformer 58 and to the heater member 32.

Various modifications of the above described embodiment of the invention will be apparent to those skilled in the art, and it is to be understood that such modifications can be made without departing from the scope of the invention, if they are within the spirit and the tenor of the accompanying claims.

What I claim is:

1. In combination with apparatus for producing high strength, highly refractory glass filaments, which apparatus includes a bushing having a perforated heater plate extending therethrough and through which all glass being melted must pass, a pair of leads connected to spaced portions of said heater plate, power means for supplying power to said leads, and a plurality of bushing tips at the bottom of said bushing, means for supplying and distributing highly refractory batch to said bushing over said heater plate, and means for attenuating glass filaments from molten glass at the bushing tips, a temperature control system for controlling the temperature of said heater plate and of the glass flowing therethrough, said temperature control system comprising sensing means connected across said heater plate and to said leads for sensing voltage across said heater plate and for producing a first signal proportional thereto, means associated with said sensing means for receiving the first signal and for modulating sudden changes in the signal, and for producing a modulated, second signal, means for establishing a control signal opposed to said second signal, means for controlling the magnitude of said control signal to determine the temperature at which said heater plate is maintained, means for combining said control and second signals, amplifying means for amplifying any resulting combined signal, and semiconductor controlled rectifier means receiving any signal amplified by said amplifying means, said rectifier means being connected with said power supply means for said heater plate, and effective to become conducting and to supply power from said power supply means to said heater plate when any resulting combined amplified signal exceeds a predetermined magnitude.

2. In combination with apparatus for producing highly refractory filaments, which apparatus includes a melter having a heater member extending therethrough, a pair of leads connected to spaced portions of said heater member, power means for supplying power to said leads, and a plurality of bushing tips below said heater member, means for supplying and distributing highly refractory batch to said melter and over said heater member, and means for attenuating glass filaments from molten glass at the bushing tips, a temperature control system comprising sensing means connected across said heater member and to said leads for sensing voltage across said heater member, means associated with said sensing means for modulating sudden changes in the voltage sensed by said sensing means and for producing a first signal, means for establishing a control signal of predetermined magnitude opposed to said first signal and for combining said control and first signals, amplifying means for amplifying any resulting combined signal, and semiconductor controlled rectifier means associated with said power supply means for said heater member and effective to supply current from said power supply means to said member when any combined amplified signal exceeds a predetermined magnitude.

3. In combination with apparatus for producing highly refractory fibers, which apparatus includes a melter having a heater member extending therethrough, power means for supplying power to said heater member, and a plurality of bushing tips below said heater member, means for supplying and distributing fiberizable material to said melter and over said heater member, and means for attenuating fibers from molten material at the bushing tips, a temperature control system comprising sensing means connected across said heater member for sensing voltage across said heater member and for producing a first signal proportional thereto, means associated with said sensing means for modulating sudden changes in the signal produced by said sensing means and for producing a modulated second signal, means for establishing a control signal opposed to said second signal, means for controlling the magnitude of said control signal and for combining said control and second signals, amplifying means for amplifying any resulting combined signal, and rectifier means associated with said power supply means for said heater member and effective to supply current from said power supply means to said heater member when any combined amplified signal exceeds a predetermined magnitude.

4. In combination with apparatus for producing high strength, highly refractory glass filaments, which apparatus includes a bushing having a perforated heater plate extending therethrough and through which all glass being melted must pass, a pair of leads connected to spaced portions of said heater plate, power means for supplying power to said leads, and a plurality of bushing tips at the bottom of said bushing, means for supplying and distributing highly refractory batch to said bushing over said heater plate, and means for attenuating glass filaments from molten glass at the bushing tips, a temperature control system for controlling the temperature of said heater plate and of the glass flowing therethrough, said temperature control system comprising sensing means connected across said heater plate and effective to produce a signal in response to an electrical characteristic which is proportional to the resistance of said heater plate, means associated with said sensing means for modulating sudden changes in the signal produced by said sensing means and for producing a modulated second signal, and means responsive to said modulated second signal for controlling said power supply and thereby controlling the temperature of said heater plate.

5. A bushing for melting a highly refractory glass batch composition and for forming a plurality of minute glass streams from the resulting melt, said bushing including insulating wall means defining a melting chamber, a heater plate extending substantially completely across said chamber and having a plurality of perforations therein, means for supplying and distributing the refractory glass batch to said melter above said heater plate, a plurality of bushing tips including small orifices at the bottom of said melter and communicating with said heating chamber, supply means for supplying electrical power to said plate to heat said plate and supply heat to the batch, sensing means connected across said plate and effective to produce a signal in response to an electrical characteristic which is proportional to the temperature of said heater plate, and means responsive to the signal produced by said sensing means for controlling said power supply and thereby controlling the temperature of said heater plate said responsive means causing said power supply means to supply current to said plate when the signal exceeds a predetermined magnitude and otherwise preventing flow of current from said power supply means to said plate.

6. In combination with apparatus for producing highly refractory fibers, which apparatus includes a melter having a heater member extending therethrough, power means for supplying power to said heater member, and a plurality of bushing tips below said heater member, means for supplying and distributing fiberizable material to said melter and over said heater member, and means for attenuating fibers from molten material at the bushing tips, a temperature control system comprising sensing means associated with said heater member and effective to produce a signal in response to an electrical characteristic which is proportional to the temperature of said heater member, means associated with said sensing means for modulating sudden changes in the signal produced by said sensing means and for producing a modulated second signal, and means responsive to the signal for controlling said power supply and thereby controlling the temperature of said heater member.

7. In combination with a heated receptacle including a heating member extending through an inner portion of said receptacle to be heated and to heat material near said member, and a source of electrical energy for supplying power to heat said member, a temperature control system for said receptacle comprising sensing means connected across said heater member for sensing voltage across said heater member and for producing a first signal proportional thereto, means associated with said sensing means for receiving the first signal and for modulating sudden changes in the signal, and for producing a modulated, second signal, means for establishing a control signal opposed to said second signal, means for controlling the magnitude of said control signal to determine the temperature at which said heater plate is maintained, means for combining said control and second signals, amplifying means for amplifying any resulting combined signal, and semiconductor controlled rectifier means receiving any signal amplified by said amplifying means, said rectifier means being connected with said power supply means for said heater plate, and effective to become conducting and to supply power from said power supply means to said heater plate when any resulting combined amplified signal exceeds a predetermined magnitude.

8. In combination with a heated receptacle including a heating member extending through an inner portion of said receptacle to be heated and to heat material near said member, and a source of electrical energy for supplying power to heat said member, a temperature control system for said receptacle comprising sensing means connected across said heater member for sensing voltage across said heater member and for producing a first signal proportional thereto, means associated with said sensing means for modulating sudden changes in the signal produced by said sensing means and for producing a modulated second signal, means for establishing a control signal opposed to said second signal, means for controlling the magnitude of said control signal and for combining said control and second signals, amplifying means for amplifying any resulting combined signal, and rectifiers means associated with said power supply means for said heater member and effective to supply current from said power supply means to said heater member when any combined amplified signal exceeds a predetermined magnitude.

9. In a melter including a heating strip extending through an inner portion of said melter to be heated and to heat and melt glass near said strip, and a source of electrical energy for supplying power to heat said strip, temperature control means comprising sensing means for producing a signal in response to the voltage across said heater strip, means for modulating and amplifying the signal, means for establishing a control signal opposed to said modulated and amplified signal and for combining said control signal and said modulated and amplified signal, and means responsive to the combined signal and effective to conduct current from said energy source to said strip when receiving a combined signal of a given magnitude, said responsive means otherwise preventing flow of current from said energy source to said strip.

10. In a heated receptacle including a heating member extending through an inner portion of said receptacle to be heated and to heat material near said member, and a source of energy for supplying power to heat said member, temperature control means for said member comprising sensing means for producing a signal responsive to the temperature of said heater member, means for establishing a control signal and for combining the two signals, said establishing means including a source of voltage, means for changing the power from said source in accordance with ambient temperature, and manually-controllable means for changing said control signal by regulating the power from said voltage source, and means responsive to any combined signal and effective to conduct current from said energy source to said heater member when receiving a combined signal of a given magnitude.

11. In combination with apparatus for producing high strength, highly refractory glass filaments, which apparatus includes a bushing having a perforated heater plate extending therethrough and through which glass being melted must pass, a pair of leads connected to spaced portions of said heater plate, power means for supplying power to said leads, a plurality of bushing tips at the bottom of said bushing, means for supplying refractory material to said bushing over said heater plate, and means for attenuating glass filaments from molten glass at the bushing tips, a temperature control system for controlling the temperature of said heater plate and of the glass flowing therethrough, said temperature control system comprising means connected across said heater plate at spaced portions thereof for sensing voltage across said heater plate and for producing a signal in response thereto, and means responsive to said voltage sensing means for controlling the flow of current to said perforated heater plate through said leads from said power means.

12. In combination with apparatus for producing high strength, highly refractory glass filaments, which apparatus includes a bushing having a perforated heater plate extending therethrough and through which glass being melted must pass, a pair of leads connected to spaced portions of said heater plate, power means for supplying power to said leads, a plurality of bushing tips at the bottom of said bushing, means for supplying refractory material to said bushing over said heater plate, and means for attenuating glass filaments from molten glass at the bushing tips, a temperature control system for controlling the temperature of said heater plate and of the glass flowing therethrough, said temperature control system comprising means connected across said heater plate for sensing voltage across said heater plate and for producing a signal in response thereto, means associated with said sensing means for receiving the signal and for modulating sudden changes in the signal, and for producing a modulated, second signal, and means responsive to said modulated, second signal for controlling the flow of current to said perforated heater plate through said leads from said power means.

References Cited by the Examiner
UNITED STATES PATENTS

| | | | |
|---|---|---|---|
| 2,501,499 | 3/1950 | Crowley | 219—494 X |
| 2,692,296 | 10/1954 | De Piolenc et al. | 13—6 |
| 2,769,076 | 10/1956 | Bogdan | 219—497 |
| 2,838,643 | 6/1958 | Elliot et al. | 219—497 |
| 3,103,573 | 9/1963 | Niehaus | 219—498 |
| 3,149,224 | 9/1964 | Horne et al. | 219—497 |
| 3,175,077 | 3/1965 | Fox et al. | 219—494 |

JOSEPH V. TRUHE, *Primary Examiner.*

ANTHONY BARTIS, *Examiner.*